US008011724B2

(12) United States Patent
Clayton

(10) Patent No.: US 8,011,724 B2
(45) Date of Patent: Sep. 6, 2011

(54) LEVER AND WHEEL ATTACHMENT DEVICE FOR CHAIRS

(76) Inventor: Henry Keith Clayton, Bournemouth (GB)

( * ) Notice: Subject to any disclaimer, the term of this patent is extended or adjusted under 35 U.S.C. 154(b) by 0 days.

(21) Appl. No.: 12/288,637

(22) Filed: Oct. 22, 2008

(65) Prior Publication Data

US 2010/0096900 A1 Apr. 22, 2010

(51) Int. Cl.
*A47C 13/00* (2006.01)
*B62B 1/04* (2006.01)
*B62D 21/14* (2006.01)

(52) U.S. Cl. .......................... 297/130; 280/30; 280/43

(58) Field of Classification Search .............. 297/463.1, 297/130, DIG. 4; 280/30, 47.131, 43, 47.12; 16/226

See application file for complete search history.

(56) References Cited

U.S. PATENT DOCUMENTS

| | | | | |
|---|---|---|---|---|
| 494,988 | A * | 4/1893 | Libbey | 16/226 |
| 695,368 | A * | 3/1902 | Bigelow et al. | 280/35 |
| 850,782 | A * | 4/1907 | Raymond | 280/47.131 |
| 1,873,347 | A * | 8/1932 | Smart | 16/33 |
| 2,578,488 | A | 12/1951 | Placerean | |
| 3,055,674 | A * | 9/1962 | Karwatt et al. | 280/47.131 |
| 3,462,171 | A * | 8/1969 | Mitty et al. | 280/47.26 |
| 5,769,436 | A | 6/1998 | Andrey | |
| 5,772,223 | A * | 6/1998 | Letourneau | 280/47.131 |
| 5,823,551 | A * | 10/1998 | Conroy | 280/47.131 |
| 7,328,480 | B2 * | 2/2008 | Schoemann | 16/225 |

FOREIGN PATENT DOCUMENTS

| | | | |
|---|---|---|---|
| FR | 2 523 943 | A1 | 9/1982 |
| GB | 2 442 573 | A | 4/2008 |
| GB | 2442573 | B * | 10/2008 |
| WO | WO 85/05020 | A | 11/1985 |
| WO | WO 99/61276 | A | 12/1999 |

* cited by examiner

*Primary Examiner* — Milton Nelson, Jr.
(74) *Attorney, Agent, or Firm* — Iandiorio Teska & Coleman

(57) ABSTRACT

Lever and wheel attachment device (1) for a chair with a pair of front legs (X, Y) comprising:

a) a pair of lever arms (10, 20) each having first and second ends, (10A, 10B: 20A, 20B), with the second ends (10B, 20B) being joined together, b) a foot pedal (40) at the second ends, c) a chair leg engaging member (14, 24) at each first end, d) a ground engaging wheel (15, 25) between the first and the second ends of each lever arm, each wheel (15, 25) providing a pivot point about its axis for each lever arm, in use the device (1) engages the pair of front legs and raises them off the ground, the chair is movable forward with the rear legs remaining on the ground, and the weight of the chair and a person is taken at least in part on the wheels.

9 Claims, 3 Drawing Sheets

LEVER AND WHEEL ATTACHMENT DEVICE FOR CHAIRS

The present invention relates to a lever and wheel attachment device for chairs.

It is often a problem to get elderly or disabled persons sitting in chairs close up to a table for a meal or other activity. It has been attempted to solve this by providing "skids" on the bottom of chairs so as to slide a person towards a table, but the friction between the skids and the floor may be such that it can be difficult for a carer to do this, especially when the person in the chair is heavy. Also, whether or not skids are provided, the strain on the chair can damage the chair and there is a risk that a person may be tilted out of a chair.

It has also been attempted to put four wheels on the bottom of chairs, which are deployable through a lever mechanism when it is required to move a seated person, but these are relatively complicated and when the wheels are deployed, the chair can become out of control.

It has also been attempted to place a fixed pair of wheels on the bottom of the front legs of a chair and for a carer to load the weight of a person onto the front wheels when moving a person in a chair. If however the chair is used as a support when a person is walking around it, the chair can move on its front wheels, and this can de-stabilise that person.

The invention seeks to provide a solution to this problem.

According to the present invention there is provided a lever and wheel attachment device for a chair with a pair of front legs comprising:

a) a pair of continuous lever arms each having first and second ends, said lever arms being formed from a single member which has a curved portion from which the lever arms diverge, the second ends of the lever arms being adjacent the curved portion, the front legs having inner faces which face each other, and the first ends of the lever arms being adjacent the inner faces of the front legs of the chair,
b) a foot pedal on the curved portion,
c) a chair leg engaging member which is at each first end of each lever arm, said chair leg engaging members connecting the first ends of the lever arms to the inner faces of the front legs,
d) a ground engaging wheel between the first and second ends of each lever arm, each wheel providing a pivot point about its axis for each lever arm, in use the lever and wheel attachment being such that it only engages the pair of front legs of the chair, each chair leg engaging member being connected to each front leg of a chair respectively with said pair of lever arms extending towards the rear of the chair and said foot pedal being normally in a first raised position whilst the legs of the chair are on the ground, and when downward pressure is applied to said foot pedal, said lever arms pivoting about the wheels with the perimeter of each wheel engaging the ground, raising said front chair legs off the ground so allowing the chair to be moved forward with rear legs of the chair remaining on the ground, with weight of the chair and any person on the chair being taken at least in part on said wheels.

Preferably each wheel is located such that the distance between the first ends of the lever arms and the corresponding wheel is shorter than the distance between the second ends of the lever arms and the corresponding wheel whereby to provide a mechanical advantage in lifting the chair front legs when applying downward pressure on the foot pedal. Thus the mechanical advantage is able to be obtained when each said wheel is located close to the first end of its lever arm.

Preferably at least one cord is provided having one end secured to the device and a free end securable to a chair to prevent the device falling below a plane defined by the bottom of the chair legs when a chair is lifted off the ground. The or each cord may be elasticated, and the or each elasticated cord may support said foot pedal and/or wheel in said raised position off the ground. Alternatively, one or more suitably positioned mechanical tension devices, for example springs, may be used instead of the cord or cords.

Preferably each chair leg engaging member is a bracket pivoted to each first end of each lever arm. The bracket may be generally L-shaped.

Preferably a chair leg engaging member is on one side of each lever arm, and a wheel is on an opposite side of each lever arm.

The invention also extends to a chair with the lever and wheel attachment device of the invention as above defined.

Embodiments of the invention will now be described with reference to the accompanying drawings in which.

Figure 1:
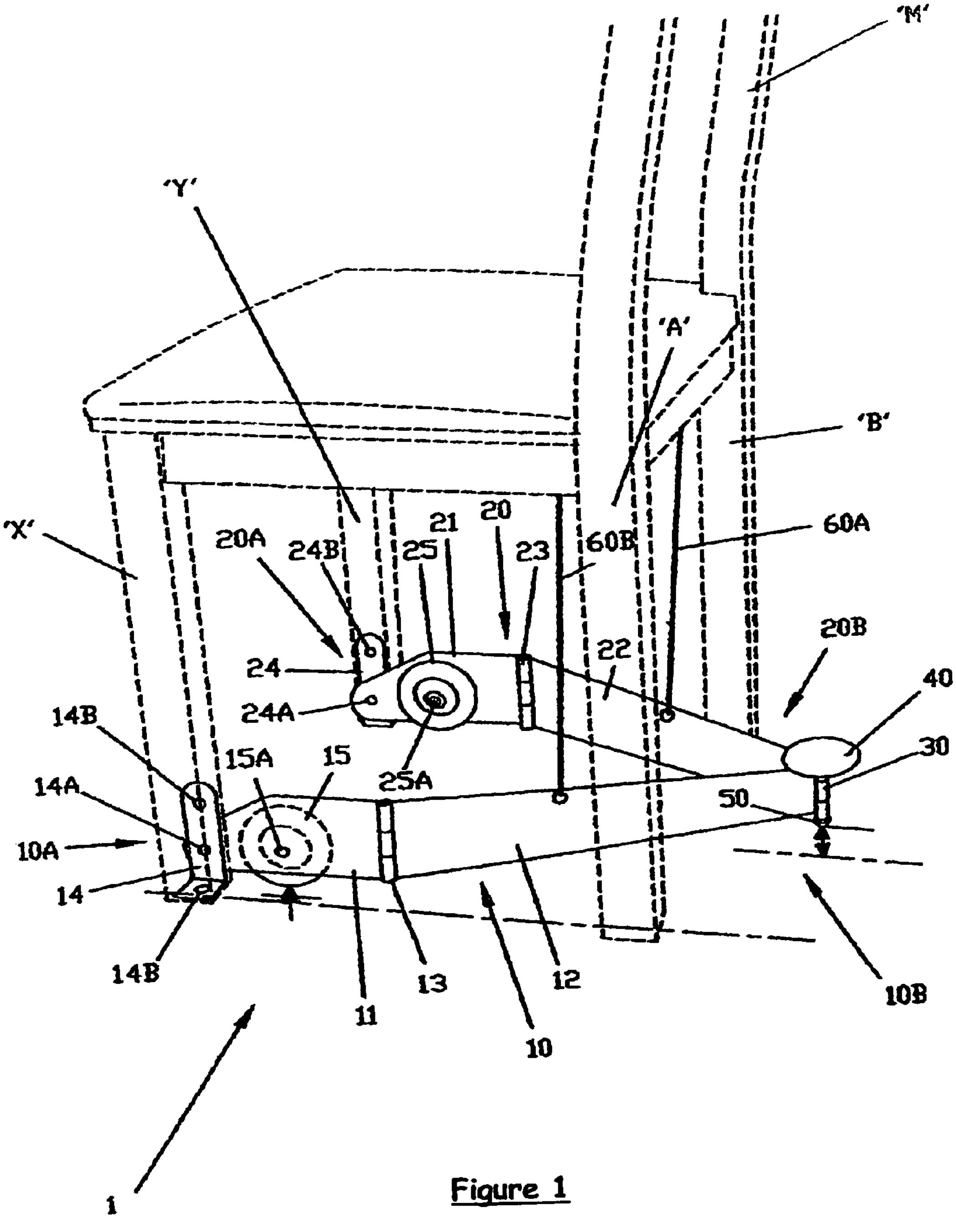
FIG. 1 shows a perspective view of a first lever and wheel attachment device and a chair, with a foot pedal in the first position.
Figure 2:
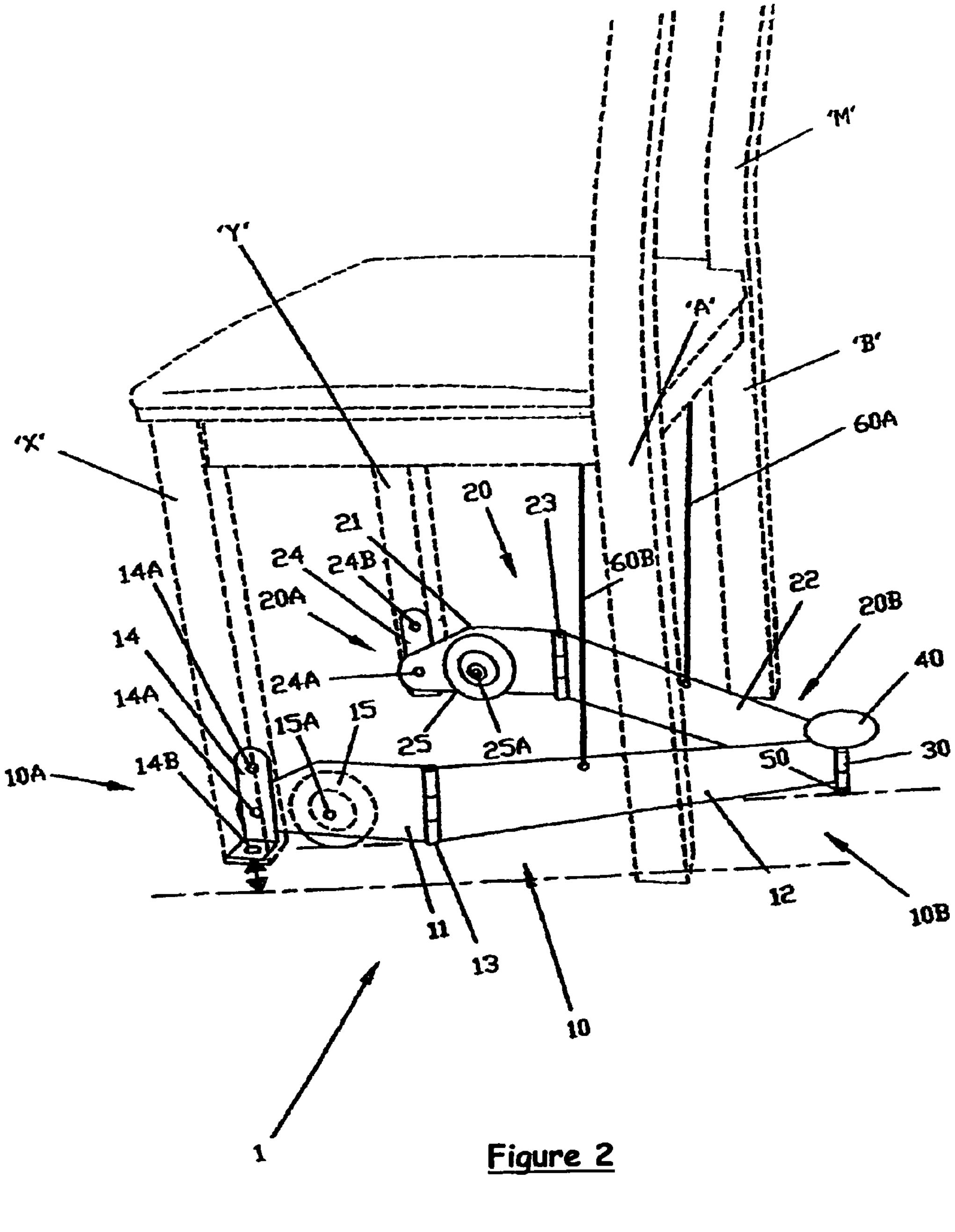
FIG. 2 shows a perspective view of the first lever and wheel attachment device and the chair, with the foot pedal in the second position.

Referring to FIGS. 1 and 2, there is shown a lever and wheel attachment device 1 for a chair with a pair of front legs "X" and "Y" and back legs "A" and "B".

The device 1 has a pair of lever arms 10,20. Lever arm 10 has a first end 10A and a second end 10B and is formed from elongate metal plate. Lever arm 10 has a front component 11 pivoted to a rear component 12 by a hinge 13. Similarly lever arm 20 has a first end 20A and a second end 20B and is formed from elongate metal plate. Lever arm 20 has a front component 21 pivoted to a rear component 22 by a hinge 23. Second ends 10B and 20B of lever arms 10,20 are pivoted together by a hinge 30. The rear components 12,22 are longer than the front components 11,21.

A foot pedal 40 is connected to the axis pin of hinge 30 on top of the hinge 30, and a skid 50 is connected to the axis pin of hinge 30 below the hinge 30. Foot pedal 40 is thus connected to the second ends of each lever arms 10,20.

Front component 11 supports at the first end 10A a chair leg engaging member in the form of an outward facing L-shaped bracket 14 pivoted to the first component 11 by a pivot pin 14A. Bracket 14 also includes apertures 14B to receive screws to secure the bracket 14 to chair front leg "X". Similarly, front component 21 supports at the first end 20A a chair leg engaging member in the form of an outward facing L-shaped bracket 24 pivoted to the front component 21 by a pivot pin 24A. Bracket 24 also includes apertures 24B to receive screws to secure the bracket 24 to chair front leg "Y".

Front component 11 has a wheel axis 15A supporting a ground engaging inward facing wheel 15 between the first and second ends 10A,10B of lever arm 10. Wheel 15 provides a pivot point about its axis 15A for lever arm 10. Wheel 15 projects below front component 11 and is the opposite side of component 11 to bracket 14. Similarly front component 21 has a wheel axis 25A supporting a ground engaging inward facing wheel 25 between the first and second ends 20A,20B of lever arm 20. Wheel 25 provides a pivot point about its axis 25A for lever arm 20. Wheel 25 projects below front component 21 and is the opposite side of component 21 to bracket 24.

A pair of cords 60A,60B is provided each having one end secured to the second components 12 or 22 and a free end securable to the chair to prevent the device falling below a plane defined by the bottom of the chair legs when a chair is lifted off the ground. The cords 60A,60B are elasticated and support the foot pedal 40 and the wheels 15,25 in a first raised position off the ground as shown in FIG. 1. As the wheels are supported off the ground, there is no tendency for the front legs to lift off the ground or reduce friction between the bottom of the front legs and the ground, due to the weight of the lever arms. The use of two cords means that one is always operational if the other fails.

As shown in FIG. 1, in use each bracket 14,24 is secured to the bottom of front legs "X" and "Y" of a chair respectively, with the pair of lever arms 10,20 extending towards and between the back legs "A" and "B" of the chair with the perimeter of each wheel not quite engaging the ground. The foot pedal is normally in a first raised position whilst the legs of the chair are on the ground.

When it is desired to move a person sitting in the chair, e.g. towards a table, a carer stands behind the chair with a foot on foot pedal 40. As shown in FIG. 2, when downward pressure is applied to the foot pedal lowering it to a second position just above the ground (with skid 50 preventing damage to the ground surface) and with cords 60A,60B stretched, the lever arms 10,20 pivot about the wheels 15,25 raising front chair legs "X" and "Y" off the ground so allowing the chair to be moved forward with weight of the chair and any person on the chair being taken at least in part on the wheels as the backrest "M" of the chair is pushed forward. When the chair is in the required position, the foot is removed from the foot pedal 40, and the foot pedal 40 returns automatically to the first position due to the weight of the person on the chair with the front chair legs back on the ground, and the restraint provided by the cords 60A,60B.

When the foot pedal 40 is not pushed down, the chair legs are always in full frictional engagement with the ground. Also, when the foot pedal 40 is pushed down, the device retains some friction between the legs "A" and "B" and the ground to reduce the effort needed to move the chair but not eliminate it, so providing controllability.

The device 1 is disclosed in my UK Patent No. 2442573 and it is designed to fit on chairs with different distances between a chair's front legs. In the device 1, the hinge 30 joining the second ends 10B, 20B of the lever arms 10, 20 provides adjustment means to adjust the distance between the first ends 10A, 20A of each lever arm 10, 20. Because the first components 11, 21 are hinged to their second components 12, 22, the first components can remain substantially parallel with the wheels 15, 25 in axial alignment.

Because the brackets 14,24 are pivoted to the first ends 10A,10B they can accommodate different angles of chair legs (i.e. not just perpendicular chair legs).

As each wheel 15,25 is located close to first ends 10A,20A of lever arms 10,20, a good mechanical advantage is provided in lifting the chair front legs when applying downward pressure on the foot pedal 40.

Because wheels 15,25 face inwards on the opposite sides of components 11,21 to outward facing brackets 14,24, so the device of the invention can be fitted to chairs which have skids between front and rear legs.

Figure 3:
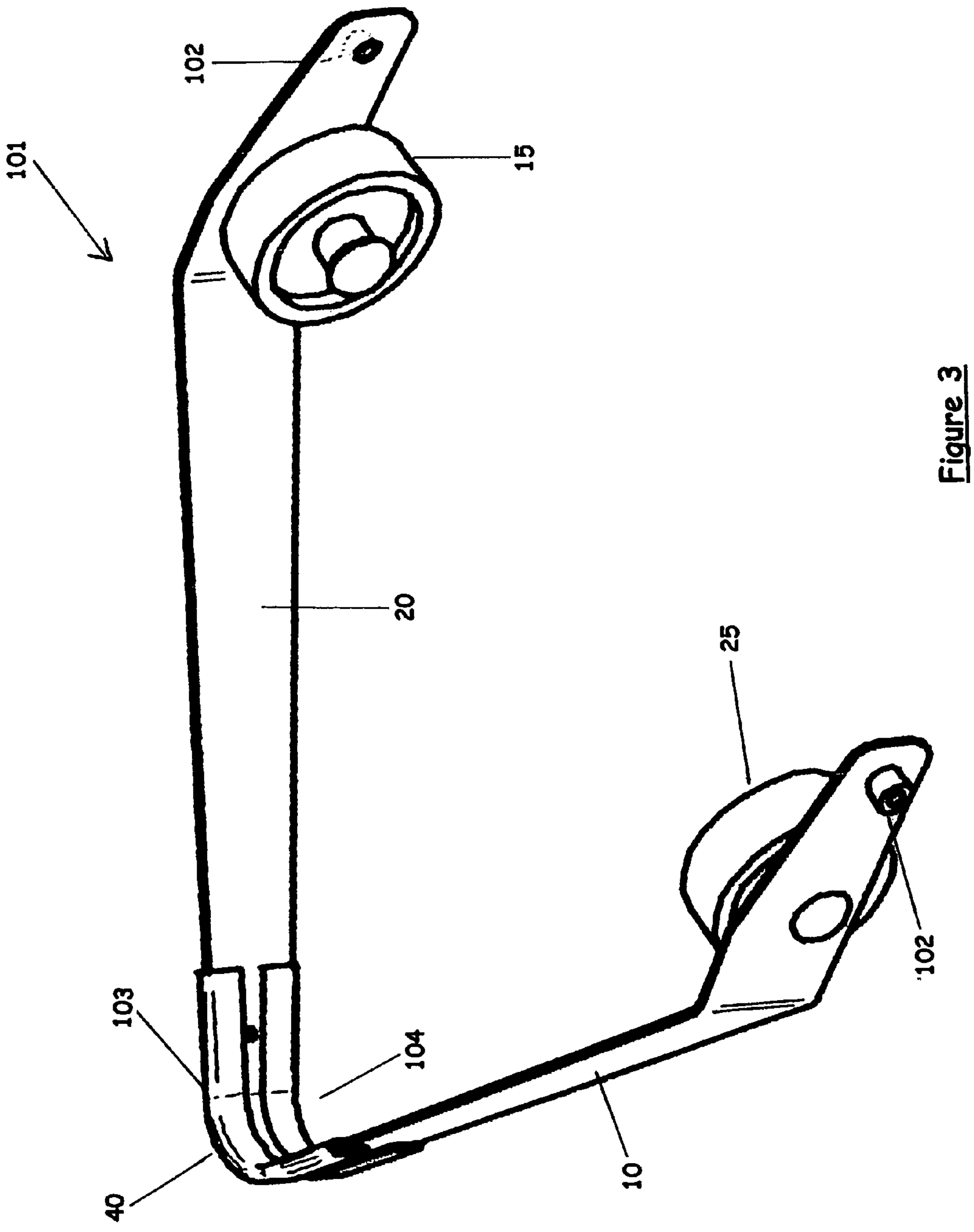
FIG. 3 is a perspective view of a second lever and wheel attachment device.

Referring now to FIG. 3, there is shown a device 101 of the invention. Similar parts in the device 101 as in the device 1 have been given the same reference numerals for ease of comparison and understanding. It will be seen that the device 101 comprises the pair of lever arms 10, 20 and the wheels 15, 25. In the device 101, the lever arms 10, 20 are formed of a single member which has a curved portion from which the lever arms diverge with the second ends of the lever arms adjacent the curved portion. This enables the hinge 30 to be omitted. In the device 101, the lever arms 10, 20 are bent inwardly towards each other adjacent the first ends to form inwardly bent portions which receive the ground engaging wheels 15, 25. This enables the hinges 13, 23 to be omitted. The first ends of the lever arms 10, 20 are adjacent inner faces of the front leas of the chair. In the device 101, the brackets 14, 25 are omitted and the front components 11-21 are connected directly to the front legs "X" and "Y" of the chair via pivots 102. The top of the curved portion is covered by an edging strip 103 which forms a foot pedal 40. The bottom of the curved portion is covered by an edging strip 104 which replaces the skid 50.

The device of the invention may be made of any suitable material.

The device of the invention may take a form different to those specifically described above. For example instead of hinge 30, the adjustment means may include spacers, e.g. spacer blocks, to fit between the second ends of lever arms 10,20. Also the foot pedal could be connected to the second ends of the lever arms 10,20 through a shaft to provide more leverage. The device would then be more "Y" shaped than "V" shaped as shown. Also the foot pedal need not extend beyond the back of the chair as shown but could be under the chair seat just forward of the back legs. This would prevent persons hitting the foot pedal with their legs.

Further modifications will be apparent to those skilled in the art without departing from the scope of the present invention.

The invention claimed is:

1. A lever and wheel attachment device for a chair with a pair of front legs comprising:

a) a pair of lever arms each having first and second ends, and a curved portion from which the lever arms diverge, said second ends of each lever arm being integrally formed with the curved portion such that said second ends are joined to the curved portion without hinges, the second ends of the lever arms being adjacent the curved portion, the front legs having inner faces which face each other, and the first ends of the lever arms being securable adjacent the inner faces of the front legs of the chair, b) a foot pedal on the curved portion, c) a chair leg engaging member which is at each first end of each lever arm, said chair leg engaging members for connecting the first ends of the lever arms to the inner faces of the front legs, d) a ground engaging wheel between the first and second ends of each lever arm, each wheel providing a pivot point about its axis for each lever arm, in use the lever and wheel attachment device being such that it only engages the pair of front legs of the chair, each chair leg engaging member being connected to each front leg of a chair respectively with said pair of lever arms extending towards the rear of the chair and said foot pedal being normally in a first raised position whilst the legs of the chair are on the ground, and when downward pressure is applied to said foot pedal, said lever arms pivoting about the wheels with the perimeter of each wheel engaging the ground, raising said front chair legs off the ground so allowing the chair to be moved forward with rear legs of the chair remaining on the ground, with weight of the chair and any person on the chair being taken at least in part on said wheels.

2. A lever and wheel attachment device according to claim 1 in which each wheel is located such that the distance between the first ends of the lever arms and the corresponding wheel is shorter than the distance between the second ends of the lever arms and the corresponding wheel whereby to provide a mechanical advantage in lifting the chairs front legs when applying downward pressure on the foot pedal.

3. A lever and wheel attachment device according to claim 1 in which each chair leg engaging member is a bracket pivoted to each first end of each lever arm.

4. A lever and wheel attachment device according to claim 1 in which a said chair leg engaging member is on one side of each lever arm, and a said wheel is on an opposite side of each lever arm.

5. A chair with a lever and wheel attachment device according to claim 1.

6. A lever and wheel attachment device according to claim 1 in which the lever arms extend inwardly towards each other adjacent the first ends of the lever arms.

7. A lever and wheel attachment device according to any one of the preceding claims claim 1 in which at least one cord is provided having one end secured to the device and a free end securable to a chair to prevent the device falling below a plane defined by the bottom of the chair legs when the chair is lifted off the ground.

8. A lever and wheel attachment device according to claim 7 in which the or each cord is elasticated.

9. A lever and wheel attachment device according to claim 8 in which the or each elasticated cord supports at least one of said foot pedal and said wheel in said raised position off the ground.

* * * * *